Patented May 11, 1937

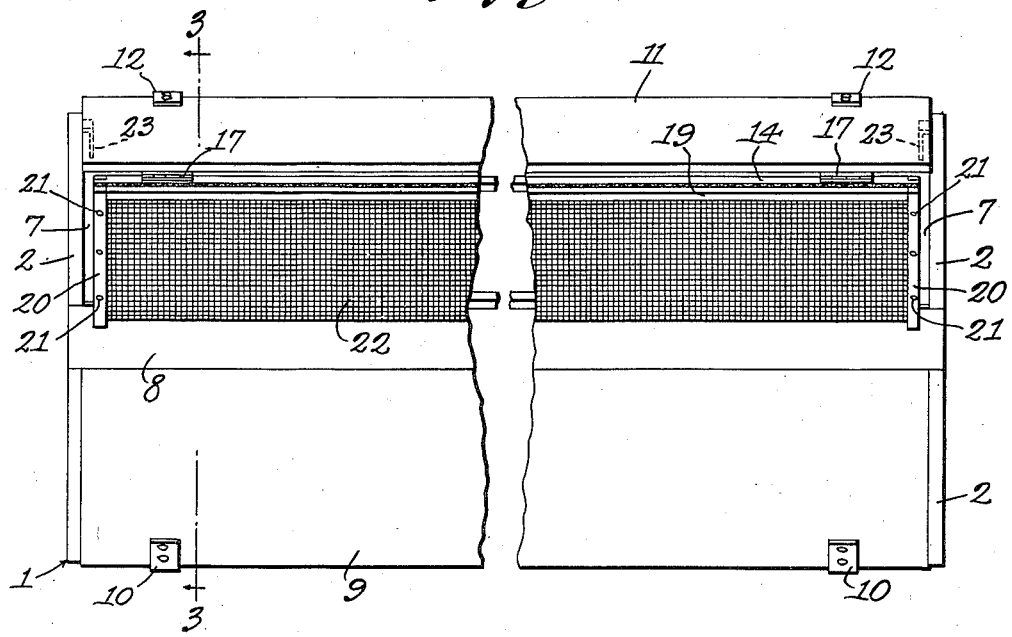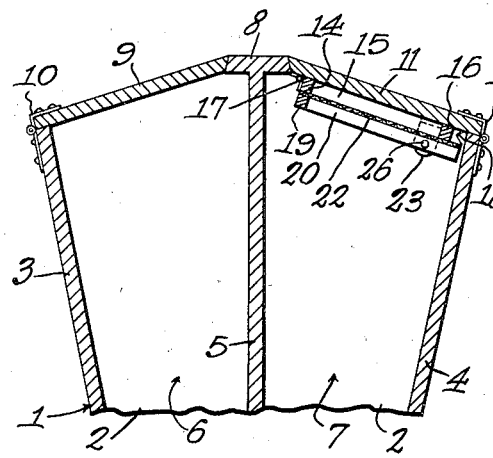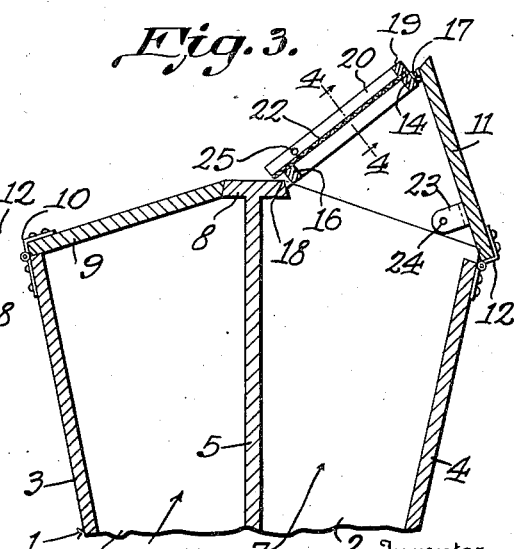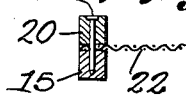

2,079,839

UNITED STATES PATENT OFFICE 2,079,839

GRAIN DRILL SCREEN

Wesley Mead Byers, Miami, Tex.

Application April 6, 1936, Serial No. 73,009

2 Claims. (Cl. 209—370)

This invention aims to provide a novel screening device for preventing bolts, nuts, pebbles and the like from finding their way into the mechanism of a grain drill, it being a matter of common knowledge that hard foreign objects of the kind specified work damage to the mechanism of the grain drill.

The invention contemplates the use of a screen, and novel means is provided for mounting the screen, for holding the screen in working position, and for holding the screen in inoperative position.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in top plan, the box of a grain drill equipped with the device forming the subject matter of this application, parts being broken away;

Fig. 2 is a transverse section of the drill box and parts carried thereby, the screen being in inoperative position;

Fig. 3 is a section on the line 3—3 of Fig. 1, the screen being in working position;

Fig. 4 is a transverse section on the line 4—4 of Fig. 3.

The device may be assembled with the boxes of grain drills of various kinds, but in the drawing there is shown a box 1 comprising ends 2 and sides 3 and 4 secured between the ends 2. A central longitudinal partition 5 extends between the ends 2 and forms a compartment 6 for fertilizer, and a compartment 7 for seed or grain, such as wheat. The side 4 may be denominated a first wall for the compartment 7, and the partition 5 may be referred to as a second wall for the said compartment. The partition 5 is provided at its upper end with a transverse rib 8. The lid for the fertilizer compartment 6 is shown at 9 and is connected by hinges 10 to the side 3, the lid 9 having a downward and outward slant. The lid 9 closes against one edge of the rib 8, between the ends 2. The lid for the grain compartment 7 is designated by the numeral 11 and is connected to the side 4 by hinges 12. The lid 11 has a downward and outward slant, and closes against one edge of the rib 8, between the ends 2.

There is provided a rectangularly elongated screen frame comprising an inner longitudinal rail 14, end pieces 15, and an outer longitudinal rail 16. Hinges 17 connect the inner longitudinal rail 14 of the first member of the screen frame with the lid 11 of the grain compartment 7, near to the free edge of the said lid. The outer longitudinal rail 16 is set back a little with respect to the end pieces 15, as shown in Fig. 2, and the end pieces 15 are supplied in their extremities with notches or seats 18 shaped to fit on one corner of the rib 8 that is carried by the partition 5. The screen frame comprises a second member, including a longitudinal inner rail 19, aligned with the rail 14, and end pieces 20, aligned with the end pieces 15. The two members of the screen frame are joined together by securing elements 21 of any desired kind, such as screws or nails. The securing elements 21 pass through a screen 22, bound between the members of the screen frame. The screen 22 projects a little beyond the longitudinal outer rail 16 of the first member of the screen frame.

Depending brackets 23 are secured to the lid 11, near to the ends thereof, and have openings 24. There are openings 25 in the end pieces 20 of the second member of the screen frame. The openings 24 and 25 are adapted to receive removable securing elements 26, such as pins.

When the device is not in use, the screen frame is folded upwardly on the hinges 17, toward the hinges 12, against the lower surface of the lid 11 and lies within the grain compartment 7. The pins 26 are inserted through the openings 24 of the brackets 23 on the lid 11, and through the openings 25 of the screen frame, and, thus, the screen frame is held folded against the under side of the lid 11, as shown in Fig. 2.

When it is desired to use the device, the lid 11 is opened as in Fig. 3, and the pins 26 are withdrawn from the openings 24 and 25, the screen frame being opened out at an angle to the lid 11, and the screen frame being supported by the rib 8, in the inclined position of Fig. 3, the seats 18 of the parts 15 of the screen frame receiving one corner of the rib 8 and the lid 11 acting as a prop for the screen frame. It is to be observed that when the screen frame is in the position specified, the screen 22 extends a little way over the rib 8 (which forms part of the second wall 5), and the rail 16 extends downwardly beyond the adjacent edge of the rib 8. Owing to this construction, when the grain is cast on the screen 22, the grain, which passes through the screen, will be directed by the part 16 into the compartment 7, but the hard foreign objects which will not pass the screen 22, will run downwardly along the screen upon the part 8 and will not find their way into the compartment 7, to the damage of the working machinery of the grain drill.

Having thus described the invention, what is claimed is:

1. In a device of the class described, a box comprising first and second walls, a lid, a hinge connecting the outer end of the lid to the first wall, a screen frame hinged to the inner end of the lid and foldable toward the lid hinge to lie against the under surface of the lid, a screen carried by the screen frame, and means for holding the screen frame folded as aforesaid, the screen frame having a free end engageable with a part of the second wall, the lid then constituting a prop which holds the screen and the screen frame in inclined position, with the screen above the box.

2. A device of the class described, constructed as set forth in claim 1, and wherein the screen extends over said part of the second wall when the screen frame is in said inclined position, thereby to discharge clear of the box, material which is too large to pass through the screen, the screen frame comprising a part remote from the hinged inner end of the frame and extended downwardly with respect to said part of the second wall, thereby to direct into the box the material which passes through the screen.

WESLEY MEAD BYERS.